UNITED STATES PATENT OFFICE.

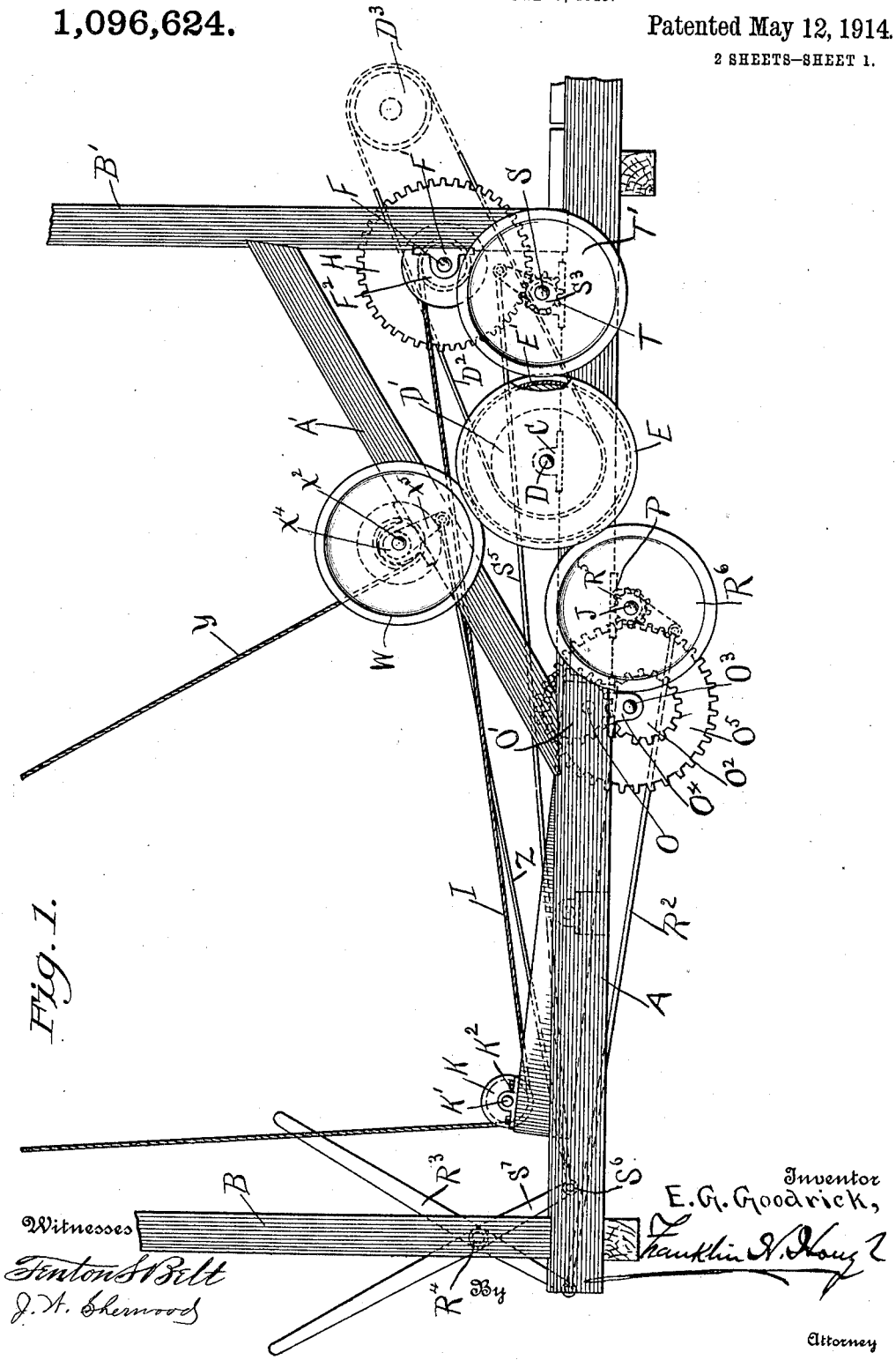

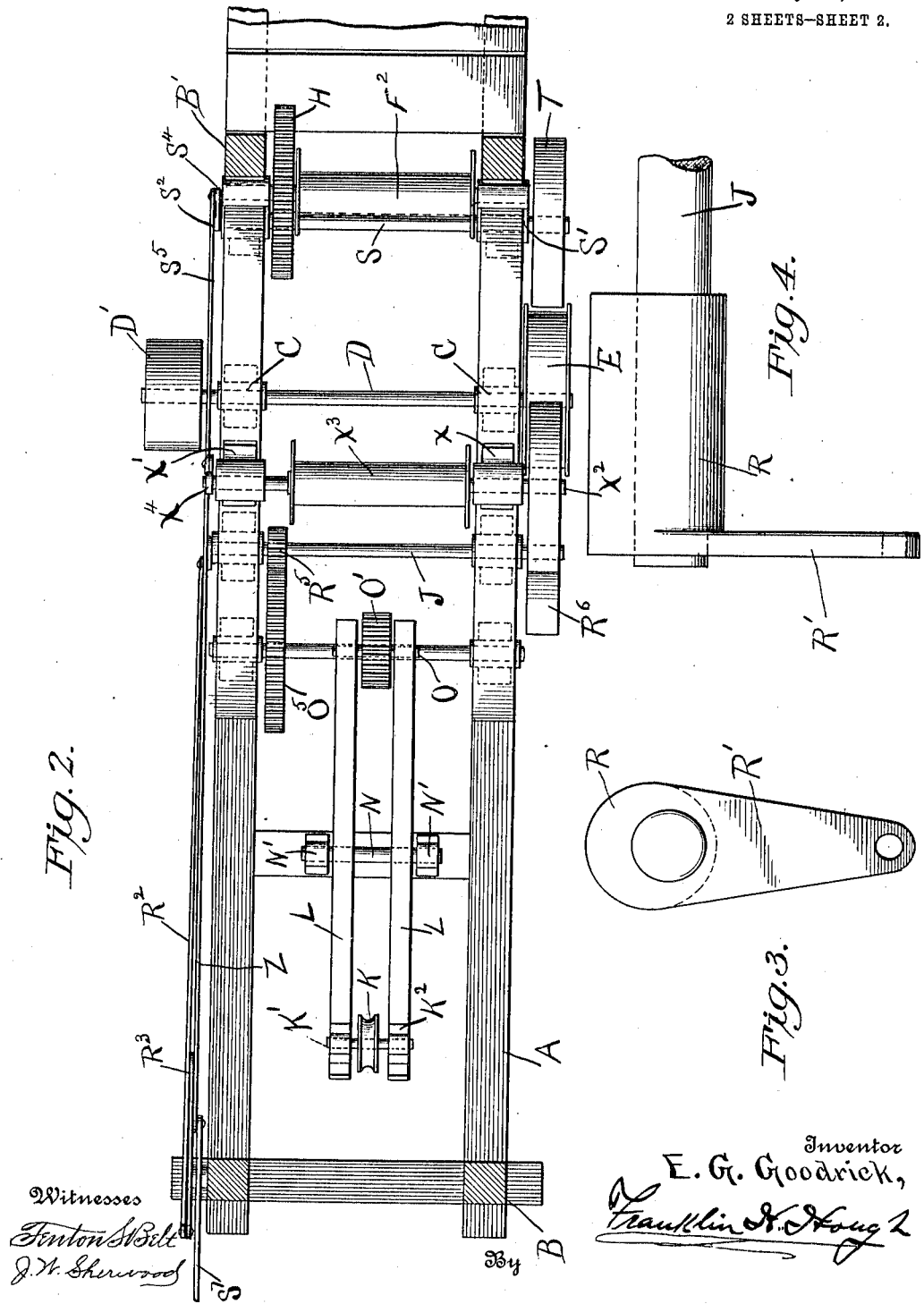

EDSON G. GOODRICK, OF BRUSH, COLORADO.

WELL-DRILLING MACHINE.

1,096,624.  Specification of Letters Patent.  Patented May 12, 1914.

Application filed June 19, 1913. Serial No. 774,674.

*To all whom it may concern:*

Be it known that I, EDSON G. GOODRICK, a citizen of the United States, residing at Brush, in the county of Morgan and State of Colorado, have invented certain new and useful Improvements in Well-Drilling Machines; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in well drilling apparatus and comprises a simple and efficient device of this nature having various details of construction and combinations and arrangements of parts which will be hereinafter fully described, shown in the accompanying drawings and then specifically defined in the appended claims.

My invention is illustrated in the accompanying drawings, in which:—

Figure 1 is a side elevation of the apparatus. Fig. 2 is a top plan view, partially in section. Fig. 3 is a detail view of an eccentric bearing shifting device, and Fig. 4 is a side elevation of the shifting means illustrated in Fig. 3.

Reference now being had to the details of the drawings by letter, A designates the frame of the apparatus having upright beams B and B', the upper portions of which are broken away. Mounted in the permanent bearing boxes C is the driving shaft D with a pulley D' fixed at one end having belted connection $D^2$ with a driving wheel $D^3$ of an engine, whereby power may be continuously transmitted to said shaft D. Fixed to the shaft D is a circumferentially grooved pulley E about which preferably is a strip E' of leather or other suitable fibrous material, forming a friction surface. A shaft F is mounted in a suitable boxing F' upon the upright beams B' and a drum $F^2$ is fixed to the shaft F as is also a gear wheel H. A drill operating cable I winds about the drum $F^2$ and is adapted to pass about a pulley K mounted upon a shaft K' and which is journaled in suitable boxings $K^2$, which are fastened upon the tilting beams L, illustrated clearly in Fig. 2 of the drawings, which beams are pivotally mounted centrally upon a shaft N journaled in the bearings N', said cable thence passing upward and adapted to extend over a pulley and have the usual drill, not shown, attached thereto. The ends of the beams L, which are opposite those carrying the shaft K, carry a stub shaft O journaled in suitable bearings in the beams and an eccentrically mounted gear wheel O' is fixed to the shaft O and has its teeth in engagement with the teeth of an eccentric gear wheel $O^2$ which is fixed to a shaft $O^3$ carried in the bearings $O^4$ which are fastened underneath the beams of the frame A.

Fastened to the under surface of the frame are the bearing blocks P, one of which has journaled therein a rocking cam member R, a detail of which is shown in Figs. 3 and 4, from which member R an arm R' projects and which is pivotally connected to a rod $R^2$ which in turn is pivotally connected with the short arm of a lever $R^3$, pivoted on a pin $R^4$. A shaft J is journaled at one end in a cam bearing R, as shown clearly in Figs. 3 and 4 of the drawings, and its other end in a bearing P at the opposite side of the frame, and a pinion $R^5$ is fixed to the shaft J and is in mesh with a gear wheel $O^5$ fastened to the shaft $O^3$. A frictionally driven pulley $R^6$ is also fastened to the shaft J and is adapted to frictionally engage the grooved driving wheel E to receive power therefrom.

A shaft S is journaled at one end in a boxing S' upon one side of the frame and in a similar boxing $S^2$ upon the opposite side, the said boxing $S^2$ having a cam bearing $S^3$ journaled therein and in which one end of the shaft S is journaled, said cam member $S^3$ having an integral arm $S^4$ projecting therefrom which is pivotally connected to a rod $S^5$ which in turn is pivotally connected at $S^6$ to the short arm of the lever $S^7$. A pinion wheel, designated by letter T and shown in dotted lines in Fig. 1, is fixed to the shaft S and is adapted to mesh with the gear wheel H, while a frictionally driven pulley T' is also fixed to the shaft S and is adapted to receive power by contact with the driving wheel D'.

Mounted upon the brace beams A' of the frame are the boxings X and X', in the former of which one end of the shaft $X^2$ is journaled and upon which the drum $X^3$ is mounted, while the other boxing X' carries a rocking eccentric boxing $X^4$ in which one end of the shaft $X^2$ is journaled, and a pulley W is fixed to the shaft $X^2$ and is driven by frictional contact with the grooved circumference of the driving pulley E. A cable Y, designed to operate a sand pump, not shown, winds about the drum $X^3$ and is designed to pass about a pulley, not shown, upon one of the beams of the frame. A rod Z is pivotally connected to the arm $X^5$ which projects from the eccentric boxing $X^4$ and is connected at its other end to the rivet $S^6$ carried by the lever $S^7$.

The operation of my invention will be readily understood and is as follows:— Power is adapted to be continually communicated to the driving wheel E from the engine through the belted connection shown. When it is desired to cause the well drilling cable to be actuated, the lever $R^3$ may be manipulated to cause the pinion wheel $R^5$, which is driven by the shaft J which in turn is operated by the friction pulley $R^6$ engaging the driving wheel, to mesh with the gear wheel $O^5$, causing the shaft $O^3$ to rotate and with it the eccentric pinion $O^2$ which is in mesh with the eccentrically mounted pinion $O'$, which will cause a rocking movement to be imparted to the beams L, thereby causing an intermittent jerking or pulling down movement upon the cable which carries the drill. The raising and lowering of the cable I may be effected by the manipulation of the lever $S^7$ which will cause the pinion wheel T to intermesh with the gear wheel H, thereby causing the latter and the drum $F^2$ to rotate and wind up the cable I thereon.

In the event of it being desired to cause the cable Y to wind upon the drum $X^3$ to operate the sand pump, the manipulation of the lever $S^7$ will cause the pulley W to be thrown frictionally into contact with the driving wheel E and simultaneously with the same movement the pinion T will be thrown out of mesh with the gear wheel H.

What I claim to be new is:—

1. A well drilling apparatus comprising a frame having a driving pulley mounted thereon, a suitably journaled shaft, a drum mounted thereon, tilting beams, a pulley journaled at one end thereof, a cable passing about said pulley and winding upon the drum, an eccentrically mounted gear journaled upon said beams, an eccentrically mounted driving pinion meshing with said gear and mounted upon the frame, and friction and gear mechanism for driving said pinion which is mounted upon the frame, thereby causing a tilting movement to be imparted to said beams, as set forth.

2. A well drilling apparatus comprising a frame having a driving pulley mounted thereon, a suitably journaled shaft, a drum mounted thereon, tilting beams, a pulley journaled at one end thereof, a cable passing about said pulley and winding upon the drum, an eccentrically mounted gear journaled upon said beams, an eccentrically mounted driving pinion meshing with said gear and mounted upon the frame, a shaft journaled at one end in a fixed bearing upon the frame and an eccentric boxing in which its other end is mounted, a pinion upon the shaft which is journaled in an eccentric bearing and a gear wheel adapted to mesh therewith and communicate motion to the eccentrically mounted driving pinion, a frictionally driven pulley rotating with the pinion carrying the shaft, and means for shifting said eccentric boxing, as set forth.

3. A well drilling apparatus comprising a frame having a driving pulley mounted thereon, a suitably journaled shaft, a drum mounted thereon, tilting beams, a pulley journaled at one end thereof, a cable passing about said pulley and winding upon the drum, an eccentrically mounted gear journaled upon said beams, an eccentrically mounted driving pinion meshing with said gear and mounted upon the frame, a shaft journaled at one end in a fixed bearing upon the frame and an eccentric boxing in which its other end is mounted, a pinion upon the shaft which is journaled in an eccentric bearing and a gear wheel adapted to mesh therewith and communicate motion to the eccentrically mounted driving pinion, a frictionally driven pulley rotating with the pinion carrying the shaft, an arm projecting from the eccentrically mounted boxing, a pivotal lever and connections between the same and said arm, as set forth.

In testimony whereof I hereunto affix my signature in presence of two witnesses.

EDSON G. GOODRICK.

Witnesses:
LEONARD E. CUDERSON,
A. C. LUSBY.